(12) United States Patent
Paterson et al.

(10) Patent No.: US 8,735,707 B2
(45) Date of Patent: May 27, 2014

(54) SYSTEM FOR MONITORING THE PROGRESS OF A MUSICAL STUDENT

(75) Inventors: Jennifer M. Paterson, Carlsbad, CA (US); Richard J. Blue, Carlsbad, CA (US)

(73) Assignee: Life Empowerment, Inc., Carlsbad, CA (US)

( * ) Notice: Subject to any disclaimer, the term of this patent is extended or adjusted under 35 U.S.C. 154(b) by 0 days.

(21) Appl. No.: 12/790,986

(22) Filed: Jun. 1, 2010

(65) Prior Publication Data

US 2011/0290096 A1 Dec. 1, 2011

(51) Int. Cl.
G09B 15/02 (2006.01)

(52) U.S. Cl.
USPC ............................................. 84/470 R

(58) Field of Classification Search
USPC ............................................. 84/470 R
See application file for complete search history.

(56) References Cited

U.S. PATENT DOCUMENTS

| | | | | | |
|---|---|---|---|---|---|
| 3,584,530 | A | * | 6/1971 | Andersen | 84/470 R |
| 5,002,491 | A | * | 3/1991 | Abrahamson et al. | 434/322 |
| 5,310,349 | A | * | 5/1994 | Daniels et al. | 434/350 |
| 5,727,950 | A | * | 3/1998 | Cook et al. | 434/350 |
| 5,734,831 | A | * | 3/1998 | Sanders | 709/223 |
| 5,823,788 | A | * | 10/1998 | Lemelson et al. | 434/350 |
| 5,974,446 | A | * | 10/1999 | Sonnenreich et al. | 709/204 |
| 6,064,856 | A | * | 5/2000 | Lee et al. | 434/350 |
| 6,211,451 | B1 | * | 4/2001 | Tohgi et al. | 84/470 R |
| 6,302,698 | B1 | * | 10/2001 | Ziv-El | 434/323 |
| 6,356,943 | B2 | * | 3/2002 | Murray et al. | 709/220 |
| 6,411,796 | B1 | * | 6/2002 | Remschel | 434/350 |
| 6,660,922 | B1 | * | 12/2003 | Roeder | 84/477 R |
| 6,760,748 | B1 | * | 7/2004 | Hakim | 709/204 |
| 7,069,308 | B2 | * | 6/2006 | Abrams | 709/218 |
| 7,157,638 | B1 | * | 1/2007 | Sitrick | 84/477 R |
| 7,297,856 | B2 | * | 11/2007 | Sitrick | 84/477 R |
| 7,848,699 | B2 | * | 12/2010 | Ohshima et al. | 434/307 R |
| 7,858,866 | B2 | * | 12/2010 | Shimizu | 84/470 R |
| 8,467,714 | B2 | * | 6/2013 | Ziv-El et al. | 434/350 |
| 2001/0036620 | A1 | * | 11/2001 | Peer et al. | 434/307 R |
| 2002/0004191 | A1 | * | 1/2002 | Tice et al. | 434/350 |
| 2004/0122693 | A1 | * | 6/2004 | Hatscher et al. | 705/1 |
| 2004/0161728 | A1 | * | 8/2004 | Benevento et al. | 434/118 |
| 2004/0215793 | A1 | * | 10/2004 | Ryan et al. | 709/229 |
| 2005/0160094 | A1 | * | 7/2005 | Morgenstern et al. | 707/9 |

(Continued)

Primary Examiner — Robert W Horn
(74) Attorney, Agent, or Firm — John R. Ross; John R. Ross, III

(57) ABSTRACT

A system for documenting the music learning process of a music student to encourage more students to study long enough to become proficient in their musical form through involvement with an immersive interactive tool. A server computer is programmed to facilitate communication between the music student and other individuals. A music student computer is connected to the server computer. The music student computer is for transmitting and receiving music information related to the learning process of the music student. Likewise, a third party computer is connected to the server computer. The third party computer allows a pre-approved third party to transmit and receive music information related to the learning process of the music student An administrator computer is also connected to the server computer. The administrator computer permits an administrator to coordinate communication between the music student and the third party. In a preferred embodiment the third party computer includes friend and family member computers connected to the server computer. These friend and family member computers are for transmitting and receiving music information related to the learning process of the music student. Preferably, the music information related to the learning process of the music student includes photos, audio files and video files.

22 Claims, 21 Drawing Sheets

(56) References Cited

U.S. PATENT DOCUMENTS

| | | |
|---|---|---|
| 2005/0182645 A1* | 8/2005 | Ehlis et al. ............... 705/1 |
| 2005/0197846 A1* | 9/2005 | Pezaris et al. ............ 705/1 |
| 2005/0209999 A1* | 9/2005 | Jou ........................... 707/2 |
| 2005/0216550 A1* | 9/2005 | Paseman et al. .......... 709/202 |
| 2005/0235062 A1* | 10/2005 | Lunt et al. ................. 709/225 |
| 2006/0085373 A1* | 4/2006 | Dhillion et al. ........... 707/1 |
| 2006/0154227 A1* | 7/2006 | Rossi et al. ............... 434/350 |
| 2006/0287878 A1* | 12/2006 | Wadhwa et al. .......... 705/1 |
| 2007/0016584 A1* | 1/2007 | Grell ......................... 707/9 |
| 2007/0099163 A1* | 5/2007 | Tseng ....................... 434/350 |
| 2007/0184424 A1* | 8/2007 | Packard et al. ........... 434/350 |
| 2008/0098087 A1* | 4/2008 | Lubeck ..................... 709/218 |
| 2008/0201447 A1* | 8/2008 | Kim .......................... 709/218 |
| 2008/0250332 A1* | 10/2008 | Farrell et al. ............. 715/753 |
| 2009/0070334 A1* | 3/2009 | Callahan et al. .......... 707/9 |
| 2009/0070852 A1* | 3/2009 | Chijiiwa et al. .......... 726/1 |
| 2009/0132585 A1* | 5/2009 | Tanis ......................... 707/104.1 |
| 2009/0291426 A1* | 11/2009 | Polivka ..................... 434/350 |
| 2010/0333019 A1* | 12/2010 | Oschwald et al. ........ 715/810 |
| 2011/0146476 A1* | 6/2011 | Zimmerman .............. 84/470 R |
| 2011/0283866 A1* | 11/2011 | Hogan ....................... 84/470 R |
| 2011/0290096 A1* | 12/2011 | Paterson et al. ........... 84/470 R |

* cited by examiner

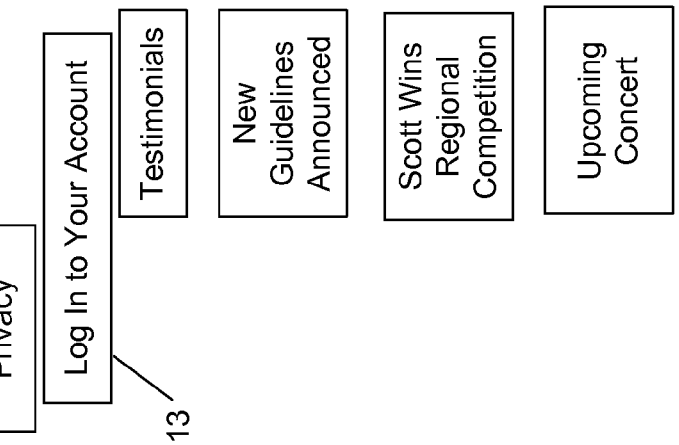
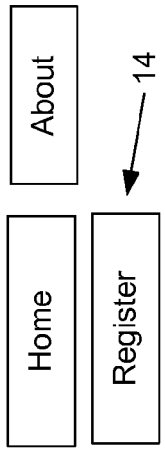
FIG. 1

Log in to your Musical Journal Account

Username

Password

☐ Remember Me          Log In

Register  Lost your password

FIG. 2

*Profile*

Howdy, Nate | Turbo | Log Out

Help

Personal Options

Visual Editor ☐ Disable the visual editor when writing

Admin Color Scheme

Keyboard Shortcuts ☐ Enable keyboard shortcuts for comment moderation | More Information

Name

Username [ nate ] — 42   Your username cannot be changed

First Name [ Nate ]

Last Name [ Harrison ] — 43

Nickname (required) [ nate ] — 44

Display name publicly as [ nate ▾ ] — 45

Contact Info:

E-mail (required) [ nate@yahoo.com ] — 46

Website [ ] — 47

[ Go To Your Website ] — 48

Dashboard

Posts
Edit
Add New

Media
Library
Add New
Comments

Profile
Your Profile

FIG. 4

My Music Journal

| Home | About | Instructions | Contact | Terms | Privacy |

Register

Nate Harrison: Pictures

Search for: [        ] Search

Video Type

| Accomplishments Pictures |
| Jam Session Pictures |
| Lesson Pictures |
| Practice Pictures |
| Recital Pictures |

Pages by Nate

| Everything Audio |
| Everything Video |
| Picture This — 91 |
| From the Teacher |
| Nate Harrison Main Page |

FIG. 9

My Music Journal

| Home | About | Instructions | Contact | Terms | Privacy |

| Register |

Nate Harrison: Audio Accomplishments

Natepianofeb3.mp3

⬇ ▲ ⬆  0:00 ──────────────────── 4:21

— 112

2 Comments. Read it below or add one

— 113

Nate:    February 4, 2010 at 2:37 pm
This is me playing Bach.

Aunt Kelly: February 7, 2010 at 4:26 pm
Nate, that is so good!!! When and where did you play this??!!

Logged in as <u>nate</u>  | Logout |

Leave a Comment:

| This is me playing the piano in February 3 at the high school. Not too shabby, eh? ☺ |

— 114

| Submit | — 115

FIG. 11

Log in to your Musical Journal Account

Username

E-mail

First Name:

Last Name:

Associated Student Name:

Relationship to Student:

Password:

Confirm Password

Register — 16

FIG. 15

*Log in to your Musical Journal Account*

Your account will be reviewed by an administrator and you will be notified when it is activated.

FIG. 16

SYSTEM FOR MONITORING THE PROGRESS OF A MUSICAL STUDENT

The present invention relates to music progress and lesson sharing systems, and in particular to music progress and lesson sharing systems that allow for the documenting of the learning process.

BACKGROUND OF THE INVENTION

Music has been part of society since the beginnings of human society. There is evidence that music existed in Africa over 50,000 years ago, prior to the dispersal of humans to different continents. The "oldest known song" was written in cuneiform, dating to 4,000 years ago from Ur. It was deciphered by Prof. Anne Draffkorn Kilmer (University of Calif. at Berkeley), and was demonstrated to be composed in harmonies of thirds and also was written using a Pythagorean tuning of the diatonic scale.

As human society has progressed, music has continued to evolve. Cultures have known for millennia that musical instruction completes an education. It provides the practice necessary to take thoughts and ideas and convert them into actions. It takes empathetic, analytical and theoretical concepts and applies them in a practical, enriching and often uplifting experience. It builds life skills of decision making, organization, discipline, critical and logical thinking, follow through and self-expression. Musical forms throughout history have become increasing more complex and interesting as cultures have increased the scope of their conceptual understanding. Yet the method of teaching a student has remained similar throughout history. An instructor usually conducts lessons with a student, monitors his progress, verifies his development and offers encouragement and increasing challenges to further develop his skills. This method has worked tremendously well throughout history with many students, particularly those with the support and encouragement of family, friends and a social network. However, there are many students who also get lost along the way. The most common thought for millions of people alive today, who took music lessons as children, is "I wish I hadn't given up music lessons." For many there is an accompanying thought, "I wish my parents hadn't let me to stop." The average American who takes music lessons quits after 8 months. Perhaps many feel they do not get enough attention or positive reinforcement and decide to give up their instrument prematurely.

Modern technology is changing the world at an amazing pace. The personal computer is a fixture in most middle class homes in modern society. It is now possible for individuals to have instant access to inexpensive communication and information in ways never thought possible just two decades ago.

The Internet

The Internet is a large network of interconnected computers that is sometimes referred to as a Wide Area Network (WAN). Initially developed by the United States Defense Department, it has expanded worldwide to a great variety of uses. A significant percentage of the population in the United States and in many other countries currently has access to the Internet and its use is growing rapidly.

The Internet is used to advertise products. Many companies have WEB sites and encourage potential customers to "visit" these pages. Creation of WEB sites is a well-developed Internet business with a great many people and organizations offering to create WEB sites. Some WEB sites are static, i.e. there is no interaction between the user and the WEB site. However, there are many well-known techniques that permit the WEB site to be made active. These techniques permit an Internet server to change WEB pages as often as desired and they permit users to communicate with a processor associated with the WEB site.

The technology also exists to establish a Local Area Network (LAN). A LAN is a network of interconnected workstations sharing the resources of a single processor or server within a relatively small geographic area. Typically, this might be within the area of a small office building. A suite of application programs can be kept on the LAN server. Users who frequently need an application can download it once and then run it from their local hard disk.

An Intranet is a network connecting an affiliated set of users (usually limited to a specific community of interest) using standard Internet protocols, esp. TCP/IP and HTTP. Intranets, also known as internal Webs, are only logically "internal" to an organization. Physically they can span the globe, as long as access is limited to the defined community of interest. To draw a comparison, the World Wide Web comprises all HTTP nodes on the public Internet. An internal web may comprise all HTTP nodes on a private network, such as an organization's LAN or WAN. If the organization is a corporation, the internal web is also a corporate web.

What is needed is a way to monitor the learning process of a music student to more effectively teach music to the music student.

SUMMARY OF THE INVENTION

The present invention provides a system for documenting the music learning process of a music student to encourage more students to study long enough to become proficient in their musical form through involvement with an immersive interactive tool. A server computer is programmed to facilitate communication between the music student and other individuals. A music student computer is connected to the server computer. The music student computer is for transmitting and receiving music information related to the learning process of the music student Likewise, a third party computer is connected to the server computer. The third party computer allows a pre-approved third party to transmit and receive music information related to the learning process of the music student An administrator computer is also connected to the server computer. The administrator computer permits an administrator to coordinate communication between the music student and the third party. In a preferred embodiment the third party computer includes friend and family member computers connected to the server computer. These friend and family member computers are for transmitting and receiving music information related to the learning process of the music student. Preferably, the music information related to the learning process of the music student includes photos, audio files and video files.

BRIEF DESCRIPTION OF THE DRAWINGS

FIG. 1 shows a preferred home page.
FIGS. 2-3 show a preferred log on page.
FIG. 4 shows a preferred personal profile page.
FIG. 9 shows a preferred pictures page.

FIGS. 11-12 show another preferred audio accomplishments page.

FIGS. 15-16 show a preferred registration page.

DETAILED DESCRIPTION OF THE PREFERRED EMBODIMENTS

Figure 18:
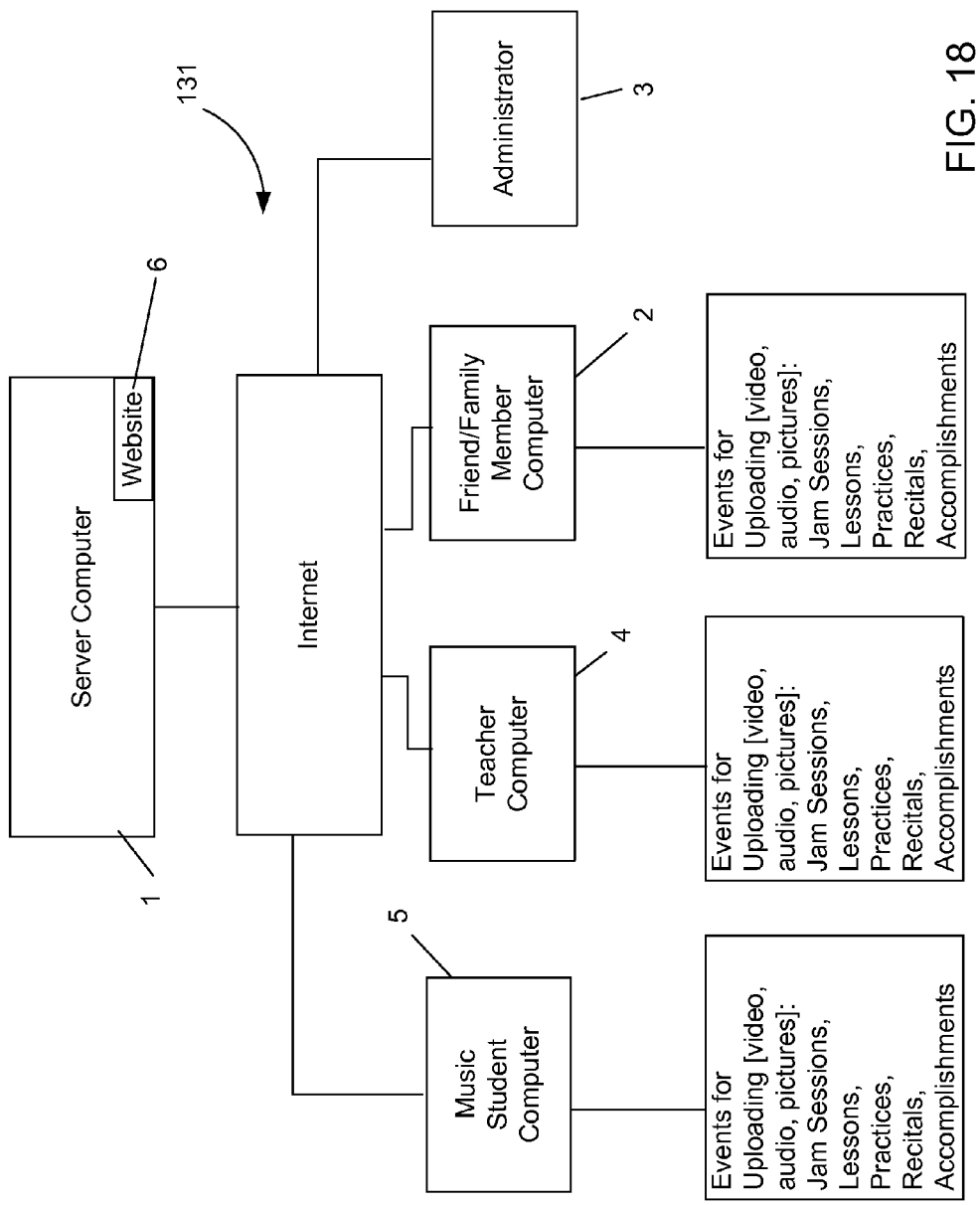
FIG. 18 shows a preferred embodiment of the present invention.

FIG. 18 shows a preferred embodiment of the present invention. The system shown in FIG. 18 allows for the storing, organizing, sharing and tracking of the music learning process of the music student. As the system is utilized the student is given positive reinforcement by those closest to him and gains incentive to conquer innate challenges inherent in mastering any musical form. Server computer 1 is programmed to facilitate safe and secure communication between the music student and those who have been approved to monitor his progress. It is one principle of the present invention that by communication with approved network members, the student will receive positive reinforcement and be continuously motivated to practice, study, perform, and learn music.

Music student monitoring website 6 is programmed onto server computer 1. Music student computer 5, teacher computer 4, administrator computer 3 and friend/family member computer 2 are each connected to server computer 6 via the Internet. In a preferred embodiment of the present invention, a music student, a music teacher and friends and family of the music student each are registered members of website 6. The music student is able to upload musical events (for example, musical performances, music practice sessions, and music jam sessions) onto website 6. The music teacher is able to review the student uploads and make comments and suggestions. The music teacher is also able to upload music related events onto website 6. Friends and family members likewise are able to review the student uploads and make comments and upload music related events onto website 6. In this fashion, the music student receives constant positive reinforcement from his music teacher and those who are closest to him. A record is kept of his musical growth so it is very easy to see progression. These features are motivating and rewarding to the student and the student is more likely to continue to want to learn his instrument.

Examples of Usage of the Website

As shown in FIG. 18, website 6 is programmed onto server computer 1. Music student computer 5 is connected to server computer 1 via the Internet. It is understood that students who are adults or older teenagers will likely operate student computer 5 themselves. However, younger children who are music students will preferably have a parent or legal guardian controlling student computer 5 on behalf of the music student. Therefore, for the purpose of this description it should be understood that a student refers to either the student himself or his guardian.

In FIG. 1 a new student has logged onto website 6. Before he can fully utilize the website, the student needs to register. The student clicks on register button 14. This takes the student to the registration page (FIG. 15). Here the student fills in the appropriate identifying information in the designated boxes. After he has filled in his identifying information the student clicks on register button 16. An email is then sent to the administrator at administrator computer 3 notifying the administrator of the registration. Also, the student view on his monitor the webpage shown in FIG. 17 informing him that his account is being reviewed by an administrator and that he will be notified when it is active.

In another preferred embodiment, the student is pre-registered by the administrator prior to logging onto the website. In this preferred embodiment it is not necessary for the student to register on his own as described above.

After approval by the administrator the student is able to log on to website 6 (FIG. 18). In FIG. 1, the student has entered into student computer 5 the website address for website 6. The student then clicks on either button 12 or button 13 to log on to his account, after which the student views the image on his monitor shown in FIG. 2.

Figure 3:
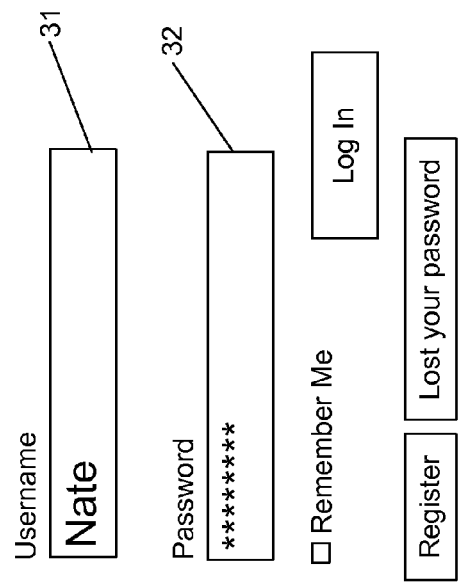

In FIG. 3, the student has entered his username and password into boxes 31 and 32 as shown. He then clicks on button 33 to complete the log on process.

Figure 5:
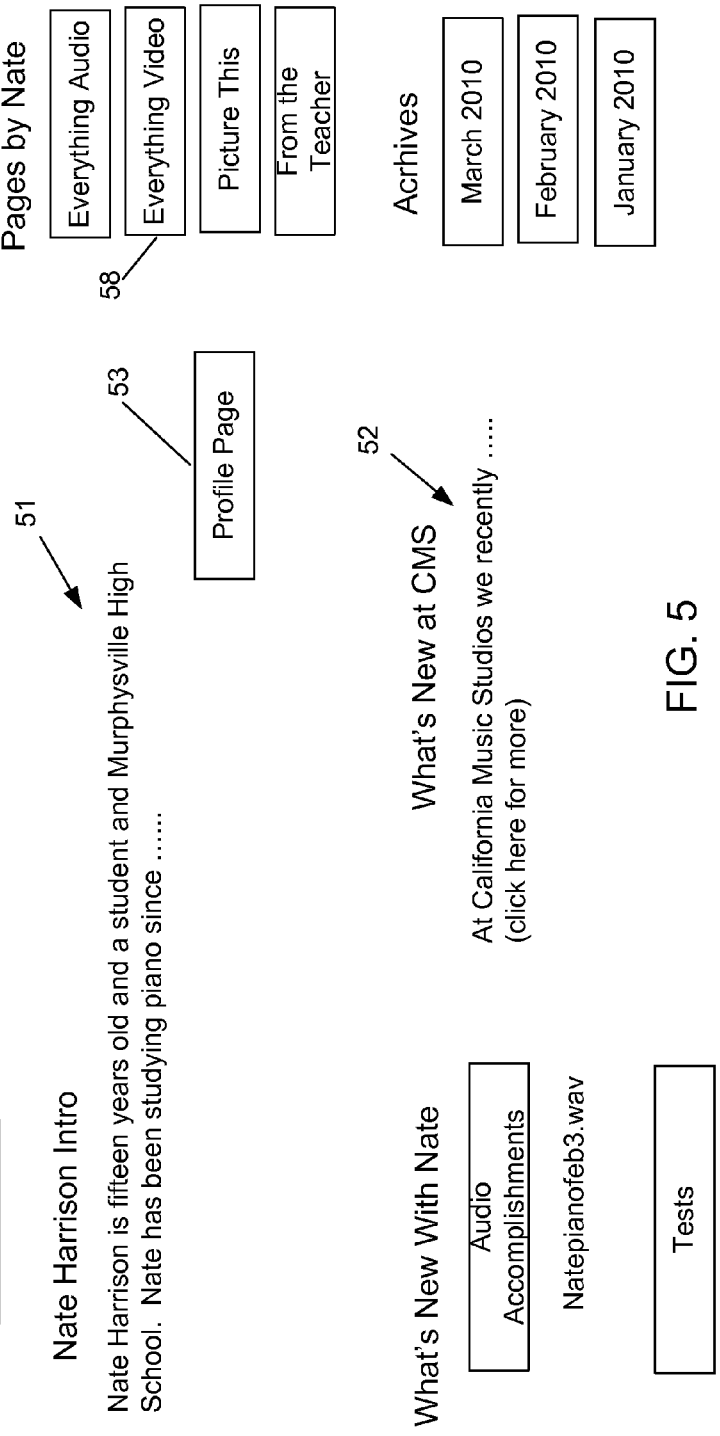
FIG. 5 shows a preferred personal home page.

In FIG. 4, the student has been directed onto his profile page. From this page the student can edit and add profile information by inserting text into boxes 42-47. In one preferred embodiment, once the username has been assigned, it cannot be edited at the profile page. From the profile page the student clicks on button 48 to proceed to his personal homepage (FIG. 5). The student can also edit or add posts to his home page. For example, the student can click on Add New button 49 to add a new post to his website.

In FIG. 5, the student is at his personal home page. His personal introduction 51 is on this page as well as update information 52 dealing covering recent events at the music school. To modify the home page, the student clicks on profile page button 53 to go back to the profile page.

Figure 6:
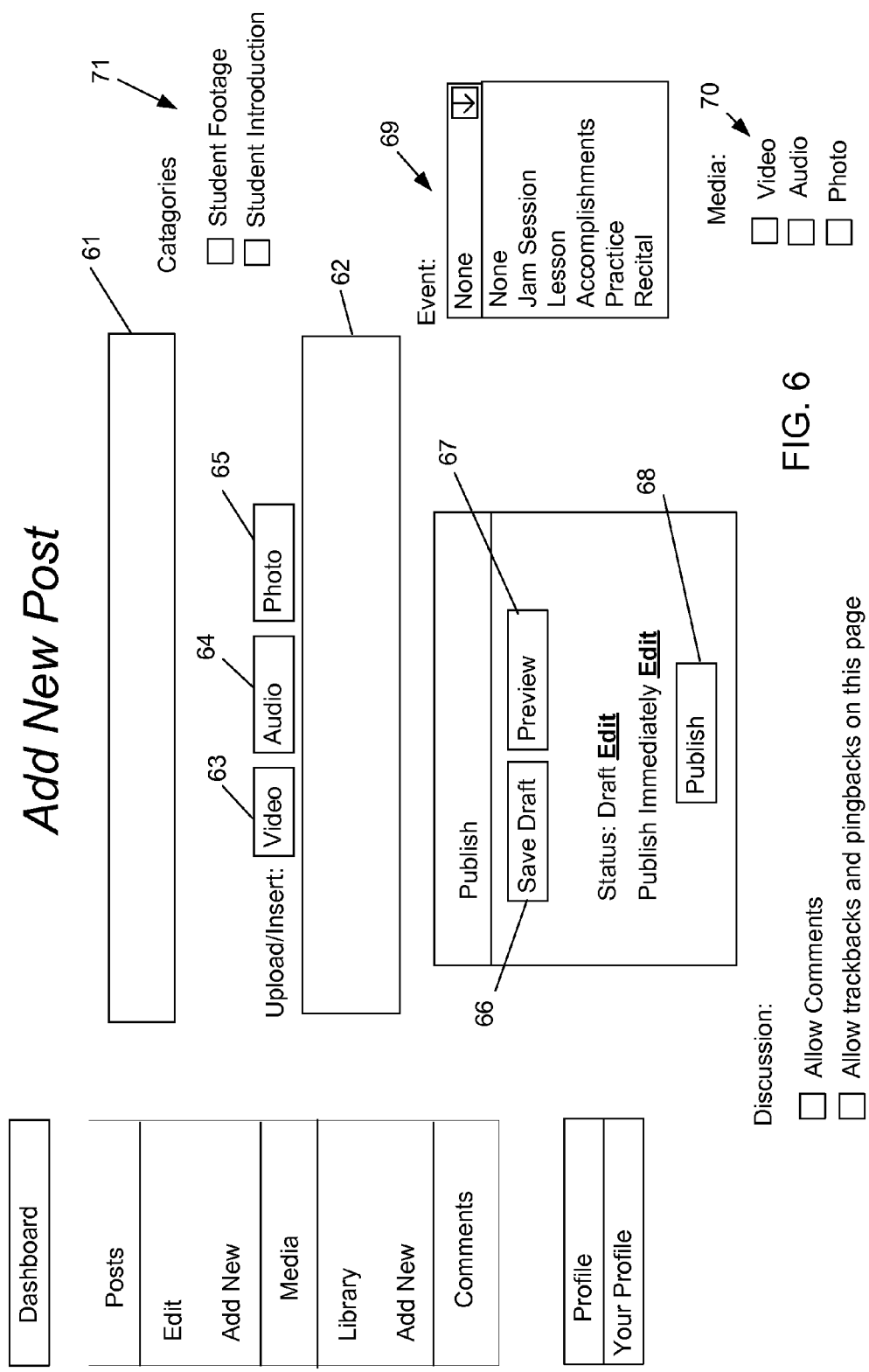
FIG. 6 shows a preferred page for adding a post.

In FIG. 6, the student is on the correct web page for adding a new post. The student fills in the title of the post by filling in box 61. The student can then fill in explanatory information regarding the post by filling in box 62. Finally, the student clicks on button 63, button 64 or button 65 to start the upload process for uploading the post to website 6. The student can then either save the post for later upload by clicking on button 66 or preview the post by clicking on button 67. The student must classify the nature of his post by selecting one of the categories from drop down menu 69 and the media type by making a selection from media selection area 70. For example, a student might want to upload a video of him playing piano and classify it as an Accomplishment Video. Once the student is satisfied with the quality of his post he can publish it onto website 6 by clicking on button 68. These classifications determine placement of the post on the student pages.

Figure 7:
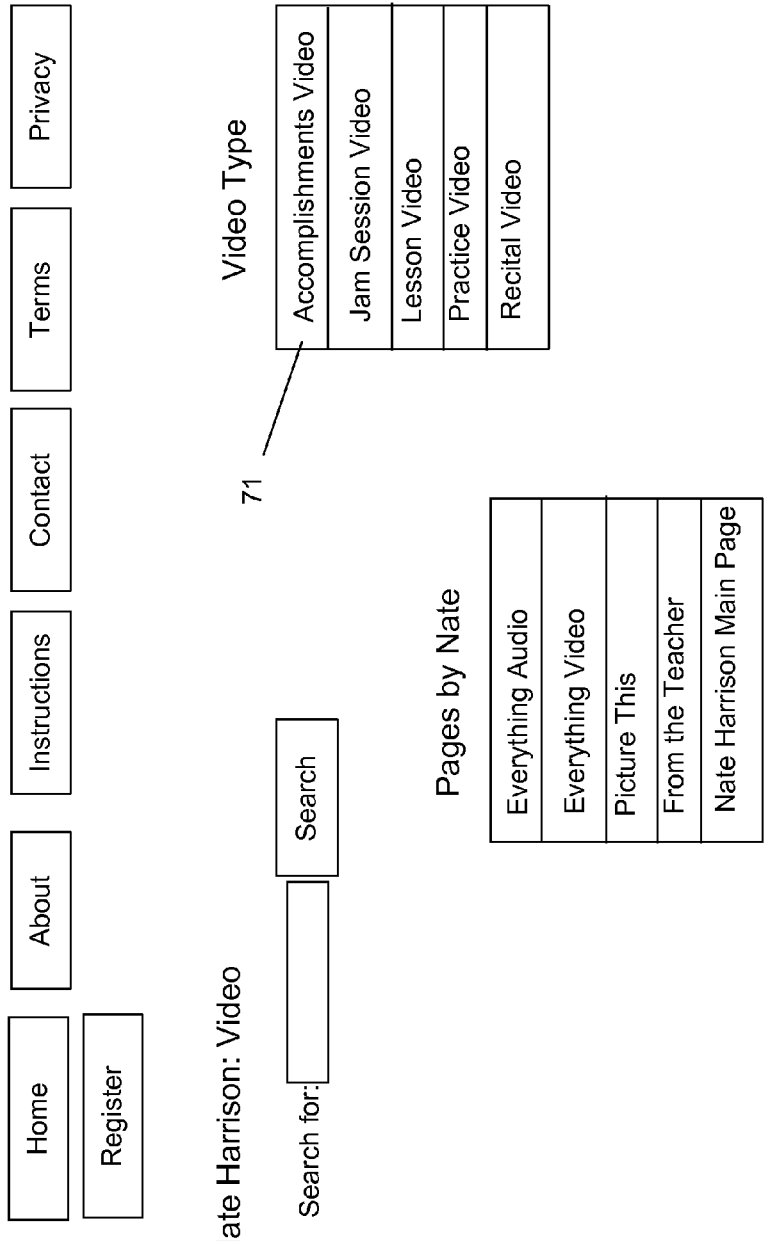
FIG. 7 shows a preferred video page.
Figure 8:
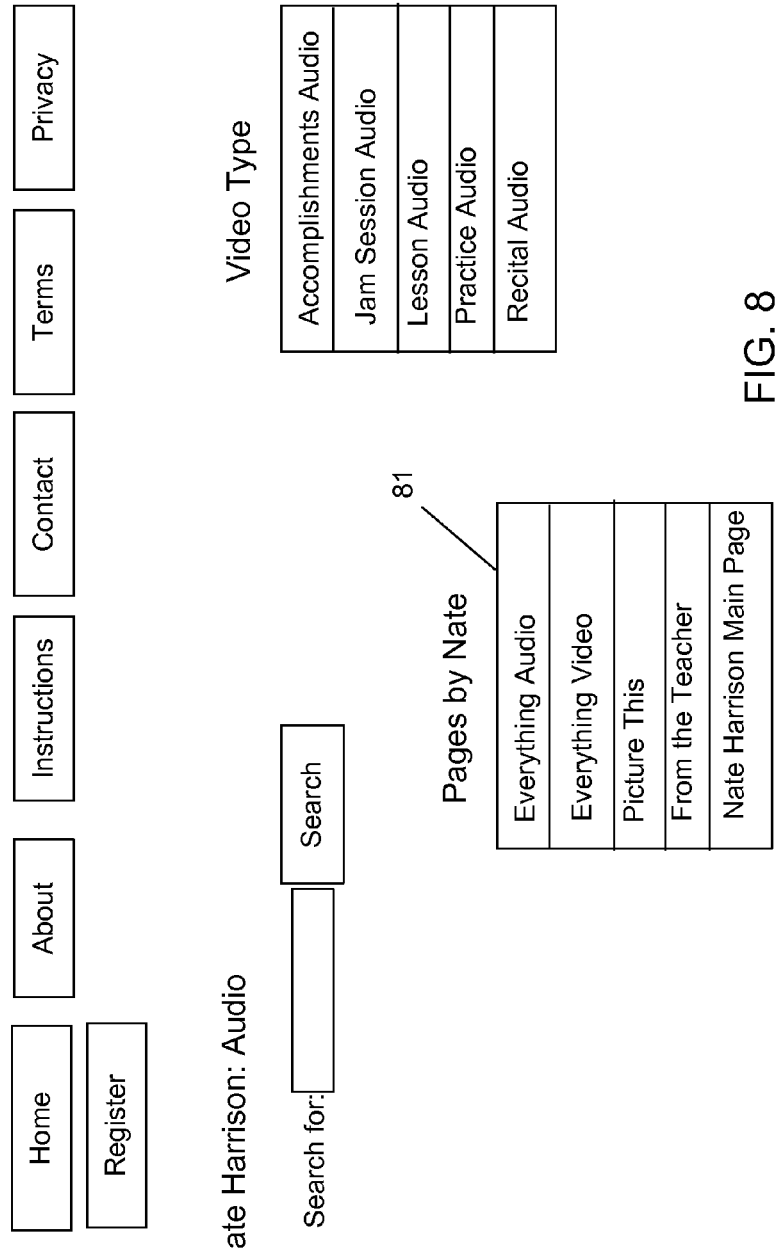
FIG. 8 shows a preferred audio page.

In FIG. 7, the student has clicked on Everything Video button 58 from his homepage (FIG. 5). From here, the student can click on specific video types. Similarly, in FIG. 8, the student has clicked on Everything Audio button 81. From here, the student will then be able to access specific audio recordings. In FIG. 9, the student has clicked on Picture This button 91. From here, the student will then be able to access specific photographs related to his music. In a preferred embodiment one month worth of posts are displayed. At the conclusion of the month, the posts are automatically transferred to the "Archives".

Figure 10:
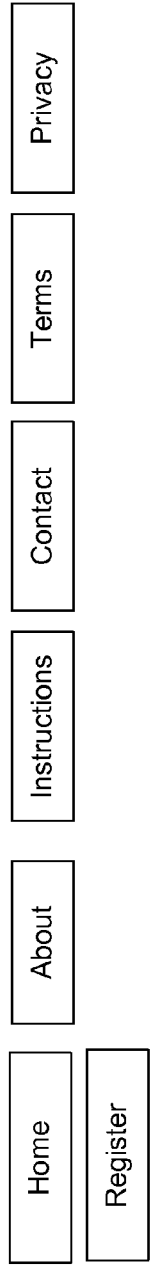
FIG. 10 shows a preferred audio accomplishments page.

In FIG. 10, the student has clicked on Accomplishments Video button 71 (FIG. 7). The Audio Accomplishments webpage shows a listing of uploaded audio recordings of the student playing piano. To listen to a particular recording, the student clicks on the recording of interest.

In FIG. 11, the student has clicked on "natepianofeb3.mp3" (FIG. 10). The student can now listen to the upload by clicking on arrow 112. The student can read comments posted by himself and others by reading them at comment area 113. The student can make additional comments by entering the comment into box 114 and clicking submit button 115.

Figure 12:

In FIG. 12, the student has added an additional comment that can be read at comment area 113.

Figure 13:
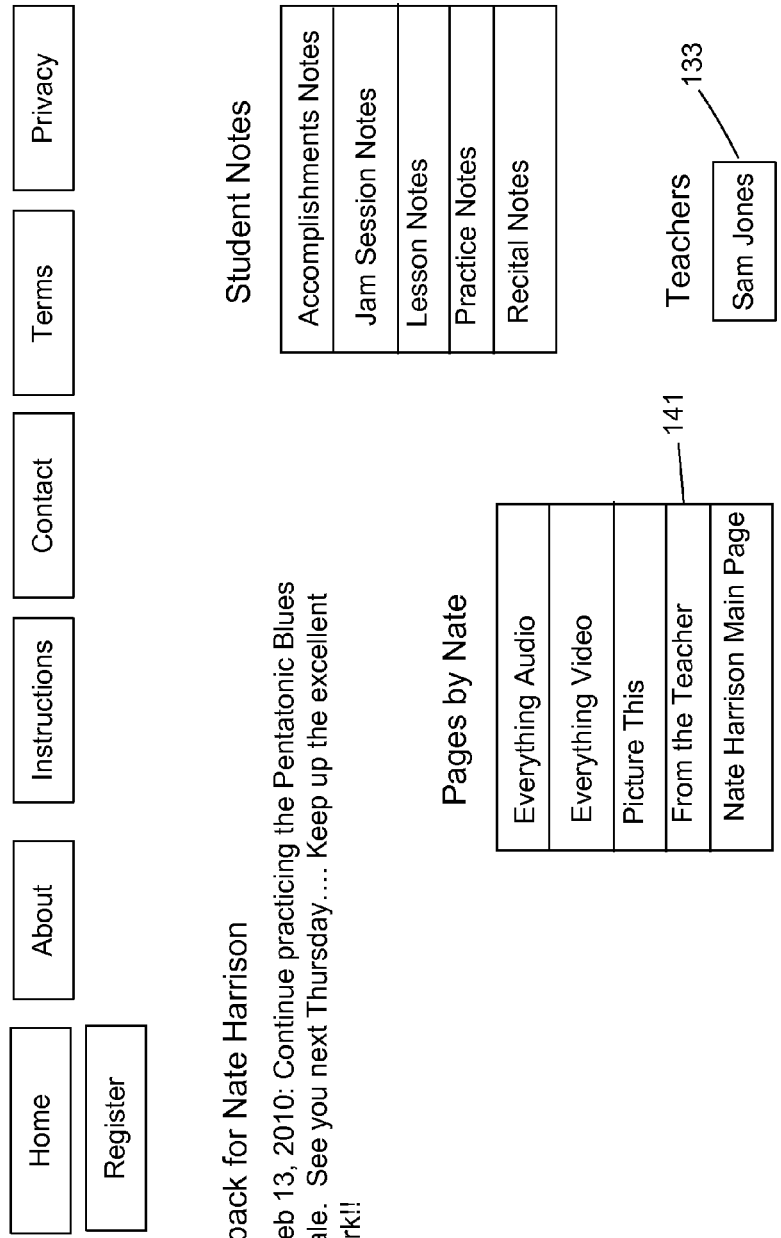
FIG. 13 shows a preferred teacher comments page.

In FIG. 13, the student has clicked on From the Teacher button 141 to read feedback from his music teacher. The music teacher's name is Sam Jones. To view the music teacher's web page the student can click on button 133. In FIG. 13, the teacher has observed the student playing the piano and has made comments giving the student instructions to practice the pentatonic blues scale and also words of encouragement to "keep up the excellent work!" In a preferred embodiment the student may have several teachers all of which would be listed on the students From the Teacher page. Preferably, only posts for the "logged in" student will be shown on the From the Teacher page. For example, if Sam Jones has ten students, only the posts for the "logged in" student will be available.

Figure 14:
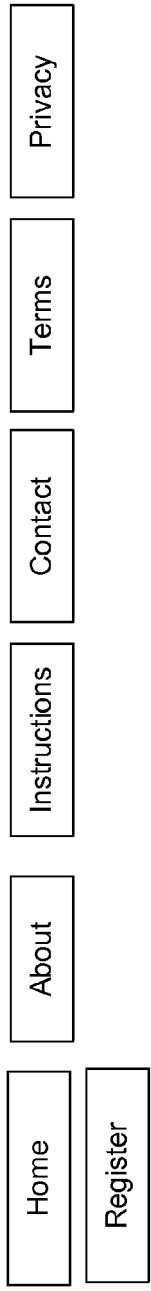
FIG. 14 shows a preferred teacher home page.

In FIG. 14, the student has navigated to the music teacher's home page. Here the student can read information about his music teacher and review the teacher's notes and archived information by clicking on archive buttons 148.

Registration of the Friend and Family Member

A friend or family member can register at website 6 (FIG. 18). In FIG. 15, a family member has arrived at a registration page after clicking on register button 14 (FIG. 1). The family member fills in the appropriate information and clicks on register button 16. The family member then views on his monitor the webpage shown in FIG. 16 informing him that his account is being reviewed by an administrator and that he will be notified when it is active. An email is then sent to the administrator at administrator computer 3 notifying the administrator of the registration attempt. Additionally, an email is sent to student computer 5 notifying the student of the registration attempt. Once the student verifies that he is willing to allow the family member access to his account information, the administrator sends notification to the family member that his registration has been accepted.

Administrator Approval of Log on Attempt

Figure 17:
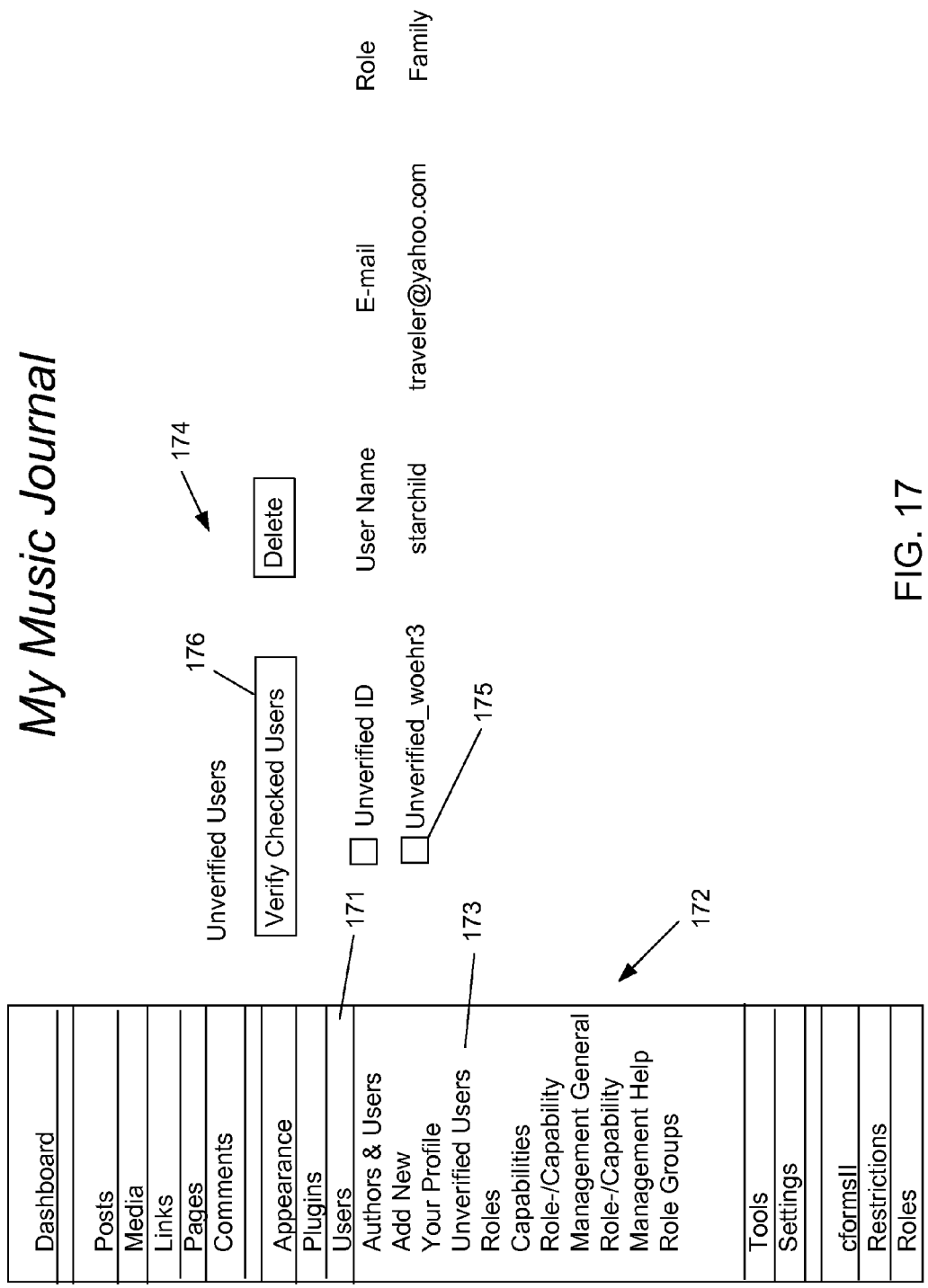
FIG. 17 shows a preferred administrator page.

In FIG. 17, the administrator has clicked on Users button 171 to bring up drop down menu 172. The administrator then has clicked on Unverified users 173 to bring up display 174. After receiving the request from username "starchild" and after receiving approval from the music student the administrator verifies the user by first clicking in box and then clicking Verify Checked Users button 176.

Local Area Network

Figure 19:
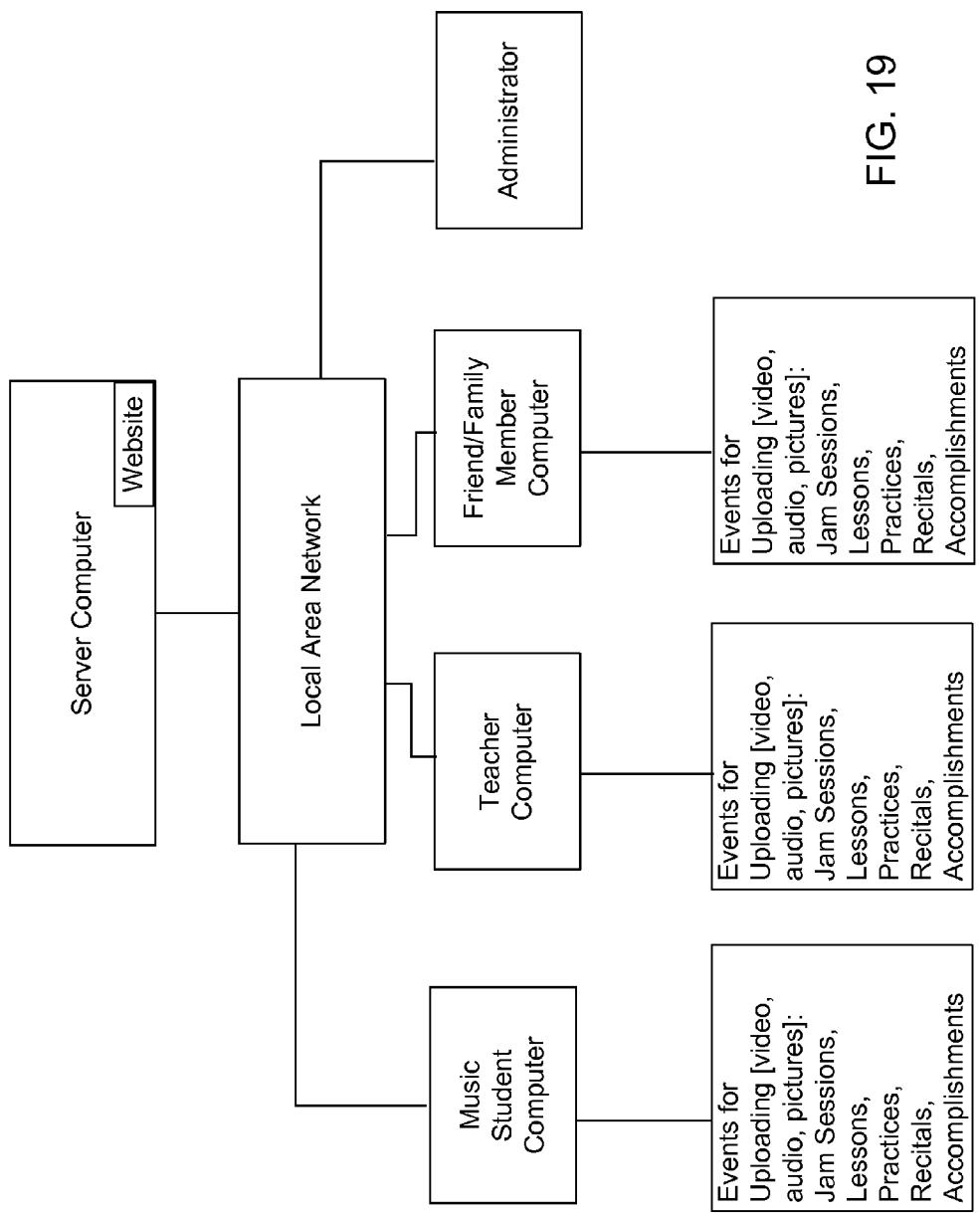
FIG. 19 shows another preferred embodiment of the present invention.

Although the above preferred embodiment discussed the utilization of the Internet for providing the connectivity between the music student, the teacher, the friend, the family member and the administrator, it is also possible to set up a Local Area Network to establish connectivity. For example, a Local Area Network can be set up at a university or other music school. Server computer 1 would be at the university and the Local Area Network would provide the connection (FIG. 19).

Student Motivator

Website 6 functions to motivate the music student to learn and practice music. It is fun and rewarding for the music student to share performances to be observed by friends and family members. Additionally, a record is preserved at website 6 of the student's progress. The student, his teacher and friends and family members will see from month to month and from year to year how the student has improved. This will serve to encourage the student to practice even more.

Teaching Tool

Website 6 is an incredible teaching tool for use by a music teacher. The music teacher can communicate and monitor all his students who are registered through website 6. The teacher can observe their latest practice session and make constructive comments. The teacher can additionally record his own musical lesson or performance and upload it for the benefit of the student. The student will be able to watch and listen to the musical performance and lesson and make adjustments accordingly.

Family and Friend Connection

Family members and friends are able to communicate with the musical student and comment on his progress. In this fashion, website 6 functions to strengthen family ties and friendships.

Third Party Computer

The above preferred embodiments disclosed the utilization of family/friend computer 2. Family/friend computer 2 is just one example of a third party computer. Third party computer 8 (FIG. 20) is a computer that allows someone other than the student and his teacher to follow the progress of the student as he learns his instrument. Besides a family member or a friend, another example of someone who would operate a third party computer is any individual or social network member approved by the student and also by the administrator. There are many types of social network members who may be interested in operating third party computer 8. For example, another student interested in learning a musical instrument similar to that of the students might seek approval and be permitted to operate the third party computer. He will then be able to track the earlier student and then decide if this is something he might also like to learn and study. Or, an individual interested in learning more about a particular teacher might seek approval and be permitted to operate a third party computer. The individual could then observe the teacher in action and decide if this would be a good instructor to hire.

A Source of Advertisement

Website 6 is a tremendous source of advertisement to the operators of website 6 as well as the individual teachers who interface with the students by utilization of website 6. Friends and family members who observe the student may become interested in music. Soon, they too may want to study music.

Accordingly, they may communicate their desires to the operators of website 6 and/or a specific teacher who is associated with the website.

Administering the Website

In a preferred embodiment, as explained above website 6 is controlled by an administrator via administrator computer 3 (FIG. 18). In a preferred embodiment, administrator 6 is employed by a music school. In this preferred embodiment, access to website 6 is generally by the administrator free of charge. However, the administrator may also charge a fee for premium access. Premium access may allow users to have enhanced upload capability to upload and store larger sized files than would be allowed to typical users who are accessing website 6 free of charge. Also in another preferred embodiment, the administrator may license website 6 to other administrators from different music schools. The other administrators from the other music schools can create their own websites with their own students, teachers, and third party members.

Website Functions With or Without the Participation of a Music Teacher

In the above preferred embodiments, it was described how the music teacher interacts with the student through website 6. It should be understood that a music student can access the website and receive benefits from the website without the participation of the music teacher. In this preferred embodiment, the student accesses website 6 via student computer 5. The student interacts with friends and family members through website 6 in a manner similar to that described above. The friends and family members access the website 6 via family/friend computer 2. This immersive interaction between the student and his friends and family members positively impacts the student and he is encouraged to study music longer so as to become proficient in his musical form.

OTHER PREFERRED EMBODIMENTS

Utilization by Multiple Music Schools

Option A: Multiple Schools Administered by a Centralized Website

Figure 20:
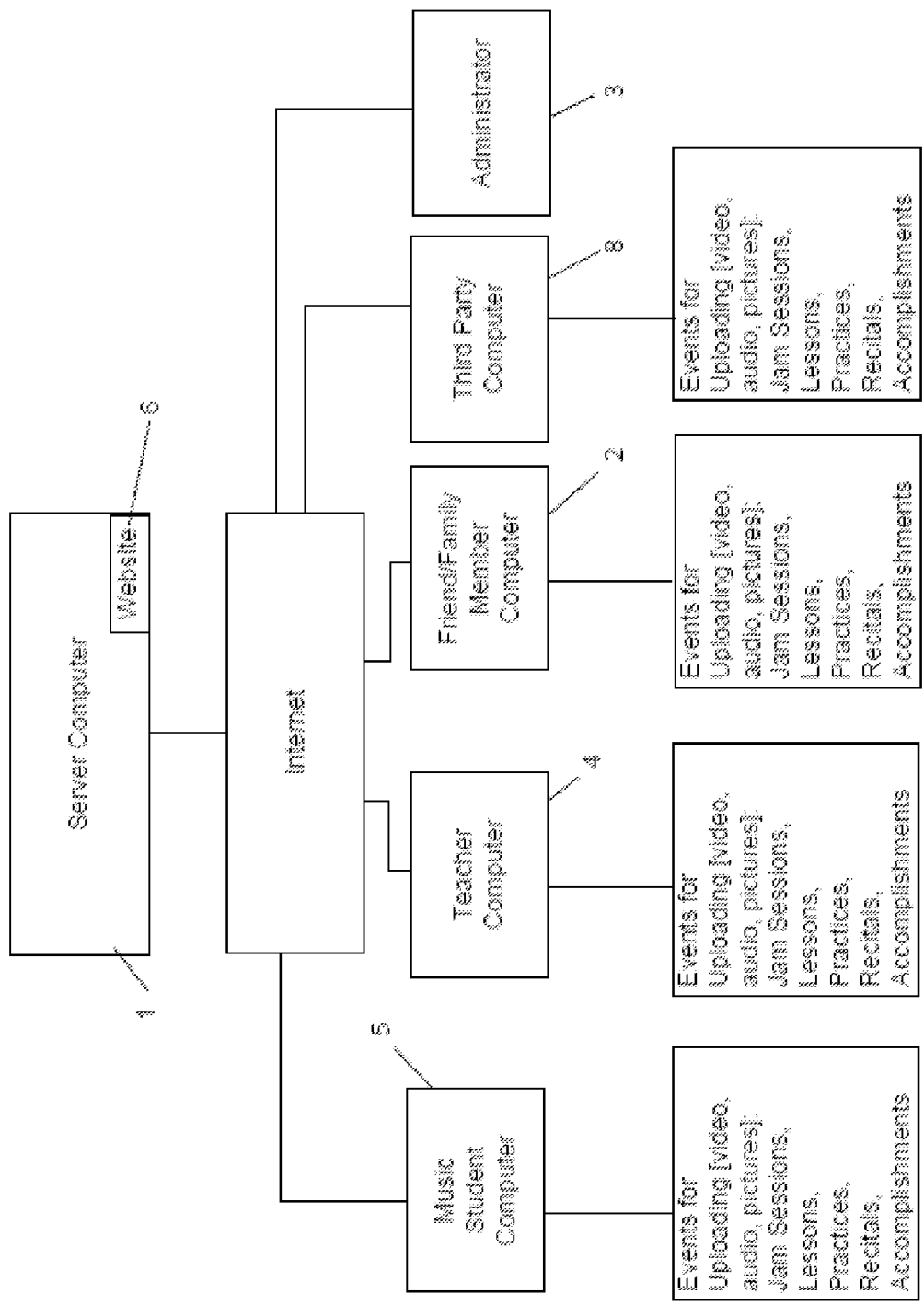
FIG. 20 shows another preferred embodiment of the present invention.
Figure 21:
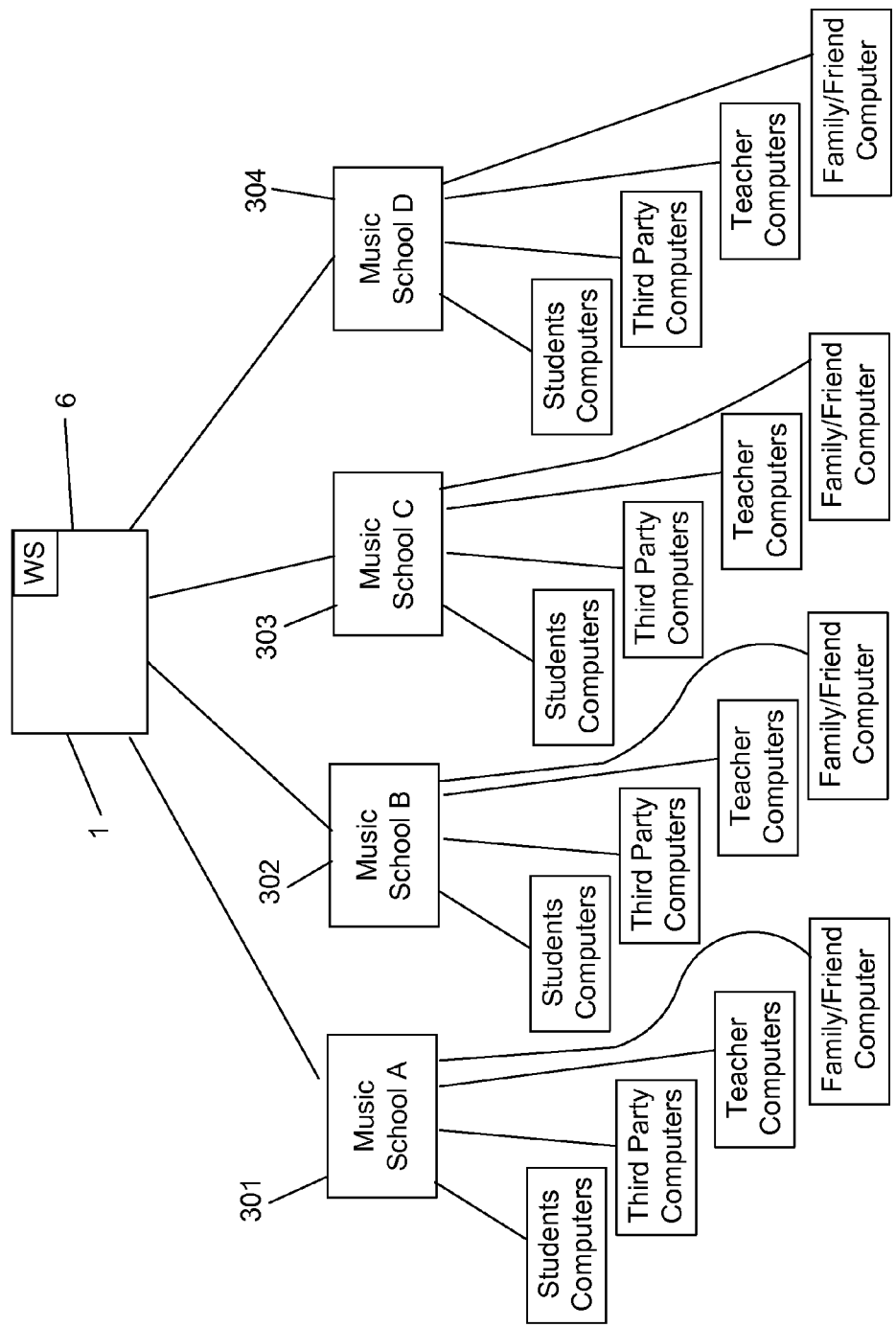
FIG. 21 shows another preferred embodiment of the present invention.

In another preferred embodiment, multiple music schools can utilize the website 6 (FIG. 20). In one preferred embodiment, the main administrator of centralized website 6 refers to website 6 as "My Music Journal". A software package is then sold to multiple music schools. For example, in the system shown in FIG. 20, each music school A-D interfaces with its own student population. To utilize website 6 a school will go to website 6 and click on a "Get the Journal Button". For example, if School A joined website 6 a preferred "School A" homepage would read as:
http://www.MyMusicJournal.com/School_A The initial set up of the system will be handled by the administrator of centralized website 6 via administrator computer 3. There will be options for ongoing administration of the purchasing school and upgrades.

Option B: Satellite Site Administration

For satellite site administration, the initial set up of the systems depicted in FIG. 18 will include a complete music journal site. This process will be automated. The interested party will purchase the license to run the site. The purchase price will include the initial site install and any bug fixes for a specified time period. Feature enhancements to the system depicted in FIG. 18 will be made available to the satellite sites on a fee basis. Upon completing purchase details, the purchaser will be instructed to enter site centric details. Upon submitting these details the site will be automatically created and immediately available. The purchaser will receive instructions to administer and brand the site with their logo. The site will function as explained above in reference to FIGS. 1-18.

Administrative Options

The satellite sites will need to populate the site with users. At the time of purchase the purchaser will have the option to choose their administration options.
Option A: Centralized Administration
  Centralized Website Administrator enters student population
Option B: Satellite Site Administration
  Students register themselves
  Purchaser administrator populates site Expanded Upload Functionality The purchasing school may opt to install the module to have upload limitation based on file size on a per fee basis as described below in the Payment by Users for Additional Uploads section of this blueprint document. In this instance, the purchasing school must obtain an Internet Merchant Account to facilitate payments. The installment and activation of this module would be handled by the centralized administrators.

Considerations for Establishing a Merchant Account

An Internet Merchant Account is procured to take real-time processing of credit card payments and develop a shopping cart system to handle payments, and then modularize this section for resale.
Version control of the website software is established. Because the overall plan is to continually offer enhancements and additionally, as bugs are worked out of the system, various versions of the software will be a part of that process. Tight version control is preferably be put in place. The initial purchase preferably includes all bug fix version releases—however feature enhancements may be charged separately as add-ons.
As stated above—server considerations for satellites is preferably addressed. Defining a relationship with a hosting company, or with Support and Development (SD) Support could provide additional income stream while providing a benefit to the purchaser.
All user manuals, administration manuals and licensing agreements will preferably be developed. The manuals can be taken from the centralized website user manuals and modified, the licensing agreements, what people are allowed and not allowed to do with the software, will need to be made from 'scratch'.
Marketing considerations are preferably taken into consideration. For example, the level of Internet marketing is preferably considered.
Support considerations: In a preferred embodiment, blogs, wikis, and forums are added to support the software. Support included with the purchase is negotiable. Also, preferably, efforts are taken so that customer expectations are high based on service offering to ensure a positive experience.

Payment by Users for Additional Uploads

Preferably there is a file size upload limitation (per month) for users of website 6. Also, preferably, users of web site can opt to pay additional fees for uploading beyond that limitation. Students, Family/Friend and Teachers would have the ability to pay for additional uploads for any student user group. So if for example, Grandma came to the site to upload her video of the recital, but upload limit for the account had been met—she could purchase additional space to upload her video if desired.

Preferred Upload Limitation Process

In a preferred embodiment, the system is set up so that each time a user from any student group uploads video/audio or photos, a folder is created at the server for the student group, based on Student ID. Inside that folder, each month a new folder is created to store that month's set of downloads. When the user group meets the monthly limit a message would display indicating upload limitations are met for the month with a link to purchase more space. Preferred options regarding how this space would be allocated is addressed below. In one preferred embodiment, the system only displays the user limit reached message with email address to contact the administrator at centralized website 6.

Further Upload Limitation Considerations

In one preferred embodiment it is possible to charge for blocks of space to 'pay as you go'. In this preferred embodiment, the user could purchase just enough space to upload the desired file. This option is attractive because it is user friendly. However it may be more difficult to set up because the administrator will have to programmatically say, this user group has purchased this amount of additional space. Allow it for this instance. But disallow the next time and show the upload limit message.

In another preferred embodiment membership levels with a monthly fee can be purchased for a desired amount of additional space. In this preferred embodiment membership plans could be set up that allow for X amount of additional space. This is easier to create because plans can be set up to place different student ID groups into different categories of membership one time per month, instead of on a continual per instance basis.

- - -

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A system for monitoring the music learning progress of music students, comprising:
 A) a server computer programmed to facilitate communication between the music students and other individuals,
 B) a plurality of music student computers connected via the Internet to said server computer, said music student computers being programmed to permit the music students to:
  1. transmit to the server computer student generated music information including musical performances,
  2. receive student generated music information from the server computer,
  3. receive requests from third party members who wish to have access to said student generated music information,
  4. transmit approval or disapproval of third party members who wish to have access to said student generated music information,
  5. receive third party member response music information, wherein said third party member response music information is transmitted by a third party in response to said student generated music information transmitted from said student computer,
 C) a plurality of third party computers connected via the Internet to said server computer, each third party computer being operated by one or more of the third parties, each of said third party computers being programmed to permit one or more third parties to:
  1. request approval to have access to said student generated music information generated by at least one particular music student,
  2. if approved by the at least one particular music student, to have access to student generated music information of said at least one particular music student,
  3. if approved by the at least one particular music student, to receive said student generated music information,
  4. if approved by the at least one particular music student, to transmit to the at least one particular music student response music information related to the learning process of the music student, and
 D) an administrator computer connected to said server computer and adapted to permit an administrator to access said server computer so that the administrator can coordinate said communication between said music student computer and the third party computer, said administrator computer being programmed to:
  1. receive requests via said plurality of third party computers from third parties who wish to have access to said student generated music information of each of said music students,
  2. forward to said music student computer said requests from said third parties, and
  3. receive said approval or disapproval from said music student computer,
  4. granting or denying third party access to student generated music information based on said approval or disapproval.

2. The system as in claim 1, further comprising a music teacher computer connected to said server computer, said music teacher computer for transmitting and receiving music information related to the learning process of the music student, wherein said administrator computer permits an administrator to access said server computer so that the administrator can coordinate said communication between said music student computer, said teacher computer and said third party computer.

3. The system as in claim 1, wherein said server computer comprises a website loaded onto said server computer, wherein said website is programmed to facilitate said communication between said music student computer and the third party computer.

4. The system as in claim 2, wherein said at least one third party computer is a friend computer connected to said server computer, said at least one friend computer for transmitting and receiving music information related to the learning process of the music student.

5. The system as in claim 4, wherein said at least one third party computer is a family member computer connected to said server computer, said at least one family member computer for transmitting and receiving music information related to the learning process of the music student.

6. The system as in claim 1, wherein said music information related to the learning process of the music student comprises:
   A) audio files,
   B) video files, and
   C) picture files.

7. The system as in claim 6, wherein said audio files, said video files and said picture files comprise:
   A) jam sessions,
   B) lessons,
   C) accomplishments,
   D) practice sessions, and
   E) recitals.

8. The system as in claim 5, wherein said student, said family member, said friend, and said music teacher are each able to upload said music information and comments onto said server computer, wherein said music information and said comments are accessible by said student, said family member, said friend, and said music teacher.

9. The system as in claim 8, wherein said music information comprises:
   A) audio files,
   B) video files, and
   C) picture files.

10. The system as in claim 1, wherein said server computer is connected to said music student computer, said third party computer and said administrator computer via the Internet.

11. The system as in claim 1, wherein said server computer is connected to said music student computer, said third party computer and said administrator computer via a local area network.

12. The system as in claim 1, wherein said third party computer allows a family member, friend or administrator and student approved individual to upload information, review student music information, make comments on student music information and support the music student.

13. A method for monitoring the music learning progress of music students, said method comprising the steps of:
   A) programming a server computer to facilitate communication between the music students and other individuals,
   B) connecting a plurality of music student computers to said server computer, each of said music student computers being programmed to permit the music students to:
      1. transmit student generated music information,
      2. receive student generated music information from the server computer,
      3. receive requests from third party members who wish to have access to said student generated music information,
      4. transmit approval or disapproval of third party members who wish to have access to said student generated music information,
      5. receive third party member response music information, wherein said third party member response music information is transmitted by a third party in response to said student generated music information transmitted from said student computer,
   C) connecting a plurality of third party computers to said server computer, each third party computer being programmed to permit third parties to:
      1. request approval to have access to said student generated music information,
      2. receive said student generated music information,
      3. transmit said third party member generated response music information related to the learning process of the music student,
   D) connecting an administrator computer to said server computer, wherein said administrator computer is operated by an administrator, said administrator computer being programmed to permit an administrator to:
      1. receive requests from said third party computer from third party members who wish to have access to said student generated music information,
      2. forward to said music student computer said requests from said third party computer, and
      3. receive said approval or disapproval from said music student computer,
      4. granting or denying access to said student generated music information based on said approval or disapproval,
   E) allowing each music student to transmit music student generated music information from said music student computer,
   F) allowing approved third parties to receive said music student generated music information at said third party computer,
   G) allowing approved third parties to transmit response music information from said third party computer, wherein said response music information is generated in response to said music student generated music information,
   H) allowing music students to receive said response music information at said music student computer,
   I) allowing the administrator to coordinate communication between said third party computer and said music student computer via said administrator computer.

14. The method as in claim 13, further comprising the step of
   A) connecting a music teacher computer to said server computer and
   B) transmitting and receiving music teacher generated music information related to the learning process of the music student.

15. The method as in claim 13, wherein said at least one third party computer is a friend computer connected to said server computer, wherein said friend computer is operated by a friend of said music student.

16. The method as in claim 13, wherein said at least one third party computer is a family member computer connected to said server computer, wherein said family member computer is operated by a family member of said music student.

17. The method as in claim 13, wherein said music student generated music information related to the learning process of the music student comprises:
   A) audio files,
   B) video files, and
   C) picture files.

18. The method as in claim 17, wherein said audio files, said video files and said picture files comprise:

A) jam sessions,
B) lessons,
C) accomplishments,
D) practice sessions, and
E) recitals.

19. The method as in claim 13, wherein said server computer is connected to said music student computer, said third party computer and said administrator computer via the Internet.

20. The method as in claim 13, wherein said server computer is connected to said music student computer, said third party computer and said administrator computer via a local area network.

21. The system as in claim 3, wherein a said website comprises a record of said student generated music information wherein said student generated music information is retrievable by date so that said student and said third party can review the progress of said student as said student improves over time.

22. The method as in claim 13, further comprising the step of maintaining a record of said student generated music information at a website stored on said server computer wherein said student generated music information is retrievable by date so that said student and said third party can review the progress of said student as said student improves over time.

\* \* \* \* \*